(12) United States Patent
Risch

(10) Patent No.: US 8,827,325 B2
(45) Date of Patent: Sep. 9, 2014

(54) LOCKING MECHANISM FOR A CARGO DOOR IN AN AIRCRAFT

(75) Inventor: Ronald Risch, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 939 days.

(21) Appl. No.: 12/733,953

(22) PCT Filed: Apr. 9, 2008

(86) PCT No.: PCT/EP2008/054274

§ 371 (c)(1),
(2), (4) Date: Mar. 31, 2010

(87) PCT Pub. No.: WO2009/059808

PCT Pub. Date: May 14, 2009

(65) Prior Publication Data

US 2010/0219647 A1      Sep. 2, 2010

Related U.S. Application Data

(60) Provisional application No. 60/985,987, filed on Nov. 7, 2007.

(30) Foreign Application Priority Data

Nov. 7, 2007  (DE) .......................... 10 2007 053 554

(51) Int. Cl.
*E05C 1/04*   (2006.01)
*B64C 1/14*   (2006.01)
(Continued)

(52) U.S. Cl.
CPC .............. *B64C 1/1415* (2013.01); *Y10S 292/41* (2013.01)
USPC ............ 292/150; 292/57; 292/63; 292/259 R; 292/DIG. 41

(58) Field of Classification Search
USPC ............ 292/57, 58, 63, 64, 70, 71, 137, 145, 292/304, 150, 194, 195, 96, 106, 153, 292/259 R, DIG. 41, DIG. 53, DIG. 64
See application file for complete search history.

(56) References Cited

U.S. PATENT DOCUMENTS 1,367,879 A * 2/1921 Laird ........................... 359/442

(Continued)

FOREIGN PATENT DOCUMENTS

DE             696 23 384           1/2003
(Continued)

OTHER PUBLICATIONS

German examination report dated Nov. 19, 2010 for DE 10 2007 053 554.8.

(Continued)

*Primary Examiner* — Kristina Fulton
*Assistant Examiner* — Faria Ahmad
(74) *Attorney, Agent, or Firm* — Jenkins, Wilson, Taylor & Hunt, P.A.

(57) ABSTRACT

The invention relates to a locking mechanism for a cargo door (1, 27) in a fuselage cell (3) of an aircraft. The cargo door (1, 27) is attached by a hinge (5) in the area of a recess (2) to open outwards. The locking mechanism comprises inter alia a number of fuselage cell fitments (9, 41) which are disposed in the area of a loading edge (8) of the cargo door (1, 27), and a corresponding number of cargo door fitments (7, 28, 61) which are fixed in the area of a lower edge (6) of the cargo door (1, 27). In accordance with the invention the cargo door fitments (7, 28, 61) can be brought into positive locking engagement in at least some areas with the fuselage cell fitments (9, 41) and the peripheral loads arising inside the fuselage cell (3)—which cause the main stress on the locking mechanism and which consequently form the basis for the dimensions—are transferred substantially by a preferably flat load transfer surface (15, 48), while the generally smaller radial loads are taken up substantially only by the sliding element (17, 31, 55). The locking of the cargo door (1, 27) is carried out by a movable sliding element (17, 31, 55) which can be secured against accidental displacement by means of an optional security bar (38). Even in the event of the sliding element (17, 31, 55) breaking, the cargo door (1, 27) remains fully secured against uncontrolled opening.

8 Claims, 10 Drawing Sheets

(51) Int. Cl.
*E05C 5/02* (2006.01)
*E05C 5/00* (2006.01)
*E05C 19/18* (2006.01)

(56) References Cited

U.S. PATENT DOCUMENTS

| | | | | |
|---|---|---|---|---|
| 2,104,639 | A | * | 1/1938 | Dall .................................. 49/24 |
| 2,546,149 | A | * | 3/1951 | Bowzer ......................... 16/110.1 |
| 2,912,845 | A | * | 11/1959 | Mordovanecy ................. 70/125 |
| 3,638,983 | A | | 2/1972 | Flournoy et al. |
| 3,653,615 | A | | 4/1972 | Spence |
| 4,179,143 | A | * | 12/1979 | Shy ................................ 292/179 |
| 4,680,891 | A | | 7/1987 | Perkins |
| 5,092,637 | A | * | 3/1992 | Miller ........................... 292/173 |
| 5,181,677 | A | | 1/1993 | Kaplan et al. |
| 6,454,210 | B1 | | 9/2002 | Plattner |
| 6,808,212 | B1 | * | 10/2004 | Hardee .......................... 292/150 |

FOREIGN PATENT DOCUMENTS

| | | |
|---|---|---|
| EP | 0 743 240 | 9/2002 |
| GB | 102 315 | 11/1916 |

OTHER PUBLICATIONS

International Search Report for PCT/EP2008/054274, mailed Jul. 25, 2008.
Written Opinion of the International Searching Authority for PCT/EP2008/054274, mailed Jul. 25, 2008.

\* cited by examiner

LOCKING MECHANISM FOR A CARGO DOOR IN AN AIRCRAFT

This application is the U.S. national phase of International Application No. PCT/EP2008/054274, filed 9 Apr. 2008 which designated the US and claims priority to German Application No. 10 2007 053 554.8, filed 7 Nov. 2007, and this application claims priority from U.S. Provisional Application No. 60/985,987 filed 7 Nov. 2007; the entire contents of each of the above applications are hereby incorporated by reference.

The invention relates to a locking mechanism for a cargo door in a fuselage cell of an aircraft, with a number of fuselage cell fitments which are disposed in the area of a loading edge of the cargo door and a corresponding number of cargo door fitments which are fixed in the area of the lower edge of the cargo door.

Cargo doors in a fuselage cell of an aircraft must transfer considerable peripheral loads. The greater the diameter of a fuselage cell so the higher are the peripheral loads which arise in the fuselage cell structure. Depending on the type of aircraft the peripheral forces can reach loads of more than 150.000 N.

The load transfer between the cargo door and the fuselage cell structure has taken place up until now through a multiple of hooks swivel mounted on a shaft which engage round substantially horizontally fixed shaft sections in the area of the fuselage cell. As a result of the high forces which have to be transferred the hooks and shaft sections are made of solid construction and are therefore heavy.

In order to prevent the hooks from swivelling automatically out from their secured position the lever mechanism for swivelling the hooks has at least one dead centre which prevents the hooks from automatically swivelling back even under load action. For additionally securing the locking mechanism separately operable cams are provided which interact with the shaft and the hooks mounted thereon and inhibit swivel action of the hooks.

The known locking devices for cargo doors in aircraft, including the lever mechanism are complicated and heavy. Furthermore the force transition by means of the hooks and shaft sections is not optimum since additional moments appear.

The object of the invention is to provide a locking mechanism for cargo doors in aircraft which enables lighter weight and improved force transfer.

This is achieved through a device having the features of a locking mechanism for a cargo door or a door in a fuselage cell of an aircraft, with a number of fuselage cell fitments which are disposed in the area of a loading edge of the cargo door and with a corresponding number of cargo door fitments which are fixed in the lower edge area of the cargo door. With this configuration, locking the cargo door can be carried out by a sliding element, and the cargo door fitments can be brought into positive locking engagement at least in some areas with the fuselage cell fitments, wherein peripheral loads of the fuselage cell are transferred substantially by a load transfer surface and radial loads are taken up substantially by the sliding element.

Since locking of the cargo door is carried out by a sliding element and the cargo door fitments can be introduced at least in some areas with keyed engagement into the fuselage cell fitments wherein peripheral loads of the fuselage cell are transferred substantially by a load transfer surface and radial loads are substantially absorbed by the sliding element, initially a structurally simpler and thereby weight-saving construction of the new type of locking mechanism of the cargo door is produced. More particularly the locking mechanism is formed with a minimum of moving parts since cargo door fitments are locally fixed relative to the cargo door and the fuselage cell fitments are connected fixedly to the fuselage cell. Furthermore the load transfer surface which is preferably formed flat transfers practically all peripheral loads coming from the fuselage cell which depending on the type of aircraft can make up more than 90% of the loads which are to be transferred in total by the locking mechanism. The vectors of the peripheral forces in the ideal case strike the load transfer surface within an angle of between about 70° and 90° and are transferred by this at this angle between the cargo door fitments and the fuselage cell fitments so that no noticeable additional moments arise. The considerably smaller radial forces which result inter alia from the pressure difference between the atmospheric air pressure and the fuselage internal pressure are consequently substantially absorbed by the sliding element.

A further development of the locking mechanism proposes that the cargo door fitments are formed substantially T-shaped and each have a handle with a toggle at the end of the handle.

Designing the cargo door fitments as more particularly T-shaped retaining ties provides a symmetrical and hereby conditioned effective force transfer to the fuselage fitments which are substantially T-shaped i.e. designed corresponding to the T-shaped retaining ties. The cargo door fitments and the T-shaped (toggle-shaped) retaining ties have substantially the same plane of symmetry and a positive locking engagement can be produced between them at least in some areas.

The toggles of the cargo door fitments fixed on the cargo door and the substantially forked fuselage fitments fixed on the side of the fuselage cell then compared with the previously known swivel hook locking mechanism for cargo doors—which results in a multiple force diversion and higher weight—enable an optimum force transfer as a result of the lowest possible change in direction of the main force flow.

The T-shaped retaining ties are fixed in the area of the lower edge of the cargo door and complete the opening and closing movement of the cargo door. Fixing the T-shaped retaining ties is undertaken by bracket plates which are riveted to the formers of the cargo door for example wherein the distance between the cargo door fitments corresponds as a rule to the standard spacing for formers. In general there are between 5 and 12 cargo door fitments used for the locking mechanism and a corresponding number of fuselage cell fitments. The cargo door is fixed in the upper area of a recess in the fuselage cell of the aircraft by a hinge, more particularly a multi-part hinge, and swivels outwards during the opening movement.

The force transfer between the toggles mounted on the cargo door and the roughly forked fitments on the fuselage cell side takes place substantially symmetrically and moment-free. The force transfer through the toggles of the cargo door fitments takes place with only small moments since the force flow takes place symmetrically relative to the system of formers in the aircraft and in a direct path.

According to a further advantageous development it is proposed that the fuselage cell fitments are substantially forked and have a recess to take up a toggle. An optimum force introduction is hereby guaranteed between the T-shaped toggle and the forked fuselage cell fitments between which the preferably flat load transfer face is formed in the closed state of the cargo door. Both the fuselage cell fitments and the cargo door fitments are as a result of the high loads which are to be transferred made of milled solid material more particularly aluminium, stainless steel or titanium. Alternatively the cargo door fitments and the fuselage cell fitments can be formed by way of example as integral constituent parts of the local ring formers wherein the ring formers and the fitments are made of a composite material.

According to a further development of the invention it is proposed that the cross-section of the handles is more particularly circular shaped or rectangular. The flexibility of the locking mechanism can hereby be improved in respect of possible shear movements and deformations of the fuselage recess and the cargo door which are produced for example by manoeuvre-induced flight loads, external aerodynamic effects or the internal pressure of the fuselage cell. If the cross-section of the handle end of the retaining ties has a rectangular shape by way of example and the longitudinal axis of this rectangular cross-sectional shape points in the flight direction then the locking mechanism has a higher rigidity in respect of deformations in this direction. If on the other hand the longitudinal axis of the retaining tie is aligned transversely to the flight direction then there is a higher strength in respect of radial loads which are produced by way of example through the internal pressure of the fuselage cell. Furthermore the handle of the retaining tie can more effectively follow movements in or against the flight direction. Selecting a circular cross-sectional geometry provides a uniform load bearing capacity in all directions.

According to a further development the toggles of the cargo door fitments are self-centring, more particularly have a dove-tailed shape. Thus as the cargo door is closed the toggles automatically align or centre themselves in the fuselage cell fitments.

A further development of the locking mechanism proposes that the locking of the cargo door in the closed state is undertaken by sliding the sliding element substantially parallel to a longitudinal axis of the aircraft. Depending on the type of aircraft and on the installation site of the cargo door the displacement axis of the locking slider can run parallel to the longitudinal axis of the aircraft (x-axis of the coordinate system) or however also inclined relative to this in space.

Further advantageous developments of the lock are explained in the further patent claims.

In the drawings.

In the drawings the same structural elements are each provided with the same reference numerals. The figures show different embodiments, unless stated otherwise.

Figure 1:
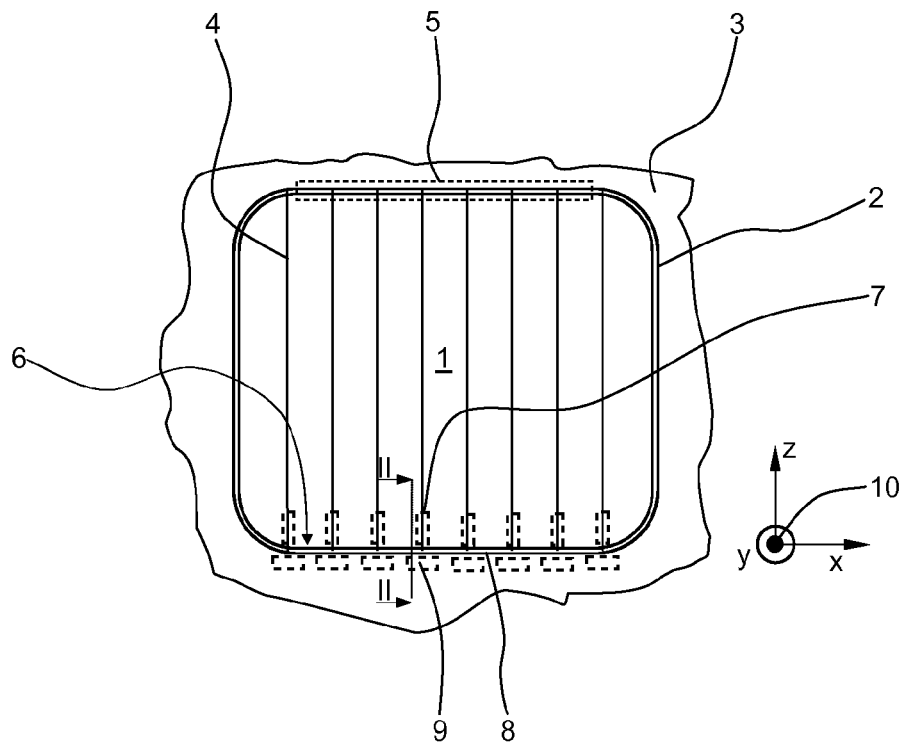
FIG. 1 shows a diagrammatic view of a cargo door in a fuselage cell of an aircraft.

FIG. 1 shows a cargo door 1 or a door in a recess 2 in a fuselage cell 3 of an aircraft (not shown). Between the recess 2 and the cargo door 1 there are elements (not shown) for a practically pressure-tight seal.

The cargo door 1 has a number of vertically aligned formers of which one former 4 as representative of the rest is provided with a reference numeral. The cargo door 1 is connected at the top by a hinge 5 to the fuselage cell 3 for articulated and swivel movement. At a lower edge 6 of the cargo door 1 there are a number of cargo door fitments mounted spaced out preferably uniformly relative to one another (former spacing), of which only one cargo door fitment 7 is provided with a reference numeral as representative for all the others. In the area of a loading edge 8 there are a number of fixed fuselage cell fitments, corresponding to the number of cargo door fitments, wherein for an improved overview only one fuselage cell fitment 9 is provided with a reference numeral. The cargo door 1 is fixedly locked in the closed position by means of the cargo door fitments and the fuselage cell fitments which engage in one another with keyed connection at least in some areas. Both the fuselage cell fitments and the cargo door fitments are connected to the formers 4 of the cargo door 1 and the formers of the fuselage cell 3 respectively by means of bracket plates (not shown). Alternatively both the fuselage cell fitments and the cargo door fitments can be integral constituent parts of the formers.

A coordinate system 10 shows the position of the components in space. The flight direction of the aircraft and its longitudinal axis runs substantially parallel to the direction of the x-axis of the coordinate system 10, a swivel axis of the cargo door 1 likewise runs roughly parallel to the x-axis and the cargo door 1 preferably opens outwards in the direction of the alignment of the y-axis. It should hereby be noted that the exterior skin of the fuselage cell 3 as a result of its curvature does not always run parallel to the z-axis of the coordinate system 10.

The fuselage cell fitments which are to be brought into engagement with the cargo door fitments form as a whole the locking mechanism of the cargo door 1 in the fuselage cell 3 or in the recess 2 in the fuselage cell 3. The locking mechanism according to the invention is not to be restricted to its use for a horizontally attached cargo door 1.

By means of the cargo door fitments 7 and the fuselage cell fitments 9 the main loads running on the peripheral side are directed in the fuselage cell 3 (substantially parallel to the z-axis) as well as further radially outwardly directed loads are directed (substantially parallel to the y-axis) over the cargo door 1. This means that the cargo door 1 is loaded with the full structural load, like the remaining fuselage cell 3 outside of the cargo door. The loads on the peripheral side can depending on the aircraft type make up more than 90% of the mechanical overall load of the cargo door fitments and the fuselage cell fitments. The remaining 10% of the overall load results inter alia from radial loads which as a result of the drop in air pressure between the internal pressure of the fuselage cell 3 and the relevant ambient air pressure endeavour to force the cargo door 1 outwards.

Figure 2:
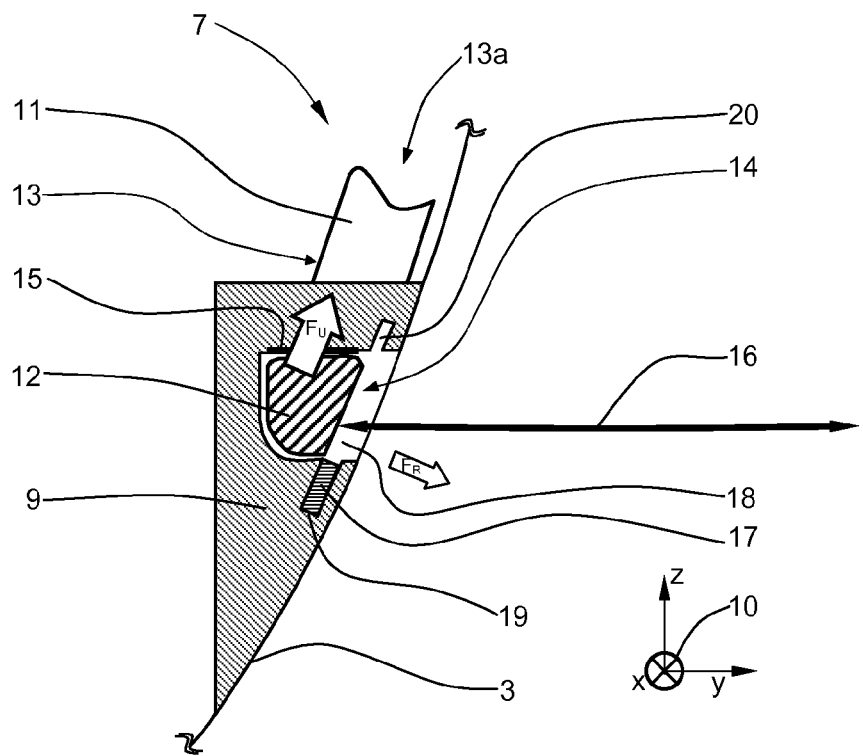
FIG. 2 shows a cross-section along the sectional line II-II of FIG. 1 through a fuselage cell fitment and a cargo door fitment in the closed but unlocked state of the cargo door.

FIG. 2 shows a diagrammatic cross-sectional view along the sectional line II-II.

The cargo door fitment 7 has a handle 11 as well as a toggle 12. The handle 11 can have in sections a rectangular, square or circular cross-sectional geometry. By suitably varying the cross-sectional geometry of the handle 11 it is possible to adjust the flexibility of the cargo door locking mechanism particularly with regard to shear movements substantially parallel to the x-axis. Shear movements of the recess 2 and thus also of the cargo door 1 in this way are caused by way of example through manoeuvre-induced loads, external gust loads or the internal pressure of the fuselage cell. The toggle 12 having a substantially circular shaped, square, polygonal or roughly trapezoidal cross-sectional geometry runs transversely in the area of a handle end 13 on both sides of the handle 11 and forms together with this a retaining tie 13a. The toggle 12 of the retaining tie 13a can be brought with positive-locking engagement at least in some areas into a correspondingly shaped recess 14 of the fuselage cell fitment 9 to produce a roughly planar load transfer surface 15. The individual force vectors of the peripheral loads engaging on the load transfer surface 15 (not drawn in) run roughly at an angle between 60° and 90° relative to same. Furthermore the peripheral loads engage practically moment-free in the area of a neutral fibre of the fuselage cell fitment 9.

As the cargo door 1 is opened and closed the cargo door fitment 7 and with it the entire cargo door 1 is swivelled in the direction of the black double arrow 16 whilst the fuselage cell fitments 9 remain locally fixed in relation to this movement. The cargo door fitment 7 is locked in the position illustrated in FIG. 2 by means of a sliding element 17 which is displaceable perpendicular to the plane of the drawing, that is parallel to the x-axis (see FIG. 4). The transfer of the peripheral loads FU of the fuselage cell 3 takes place substantially through the planar load transfer surface 15 whilst the considerably smaller radial loads FR in the locked state of the cargo door 1 are taken up substantially by the sliding element 17. These separate load flows enable a structurally simpler and weight-saving construction. The sliding element 17 is guided with sliding movement inside the fuselage cell fitment 9 in a horizontal guide 18 which is formed essentially by two grooves 19, 20. Differing from the illustrated embodiment the sliding element 17 can also be guided in the area of the cargo door fitment 7 (see FIGS. 5-7). The fuselage cell fitment 9 is connected to the fuselage cell 3.

Figure 3:
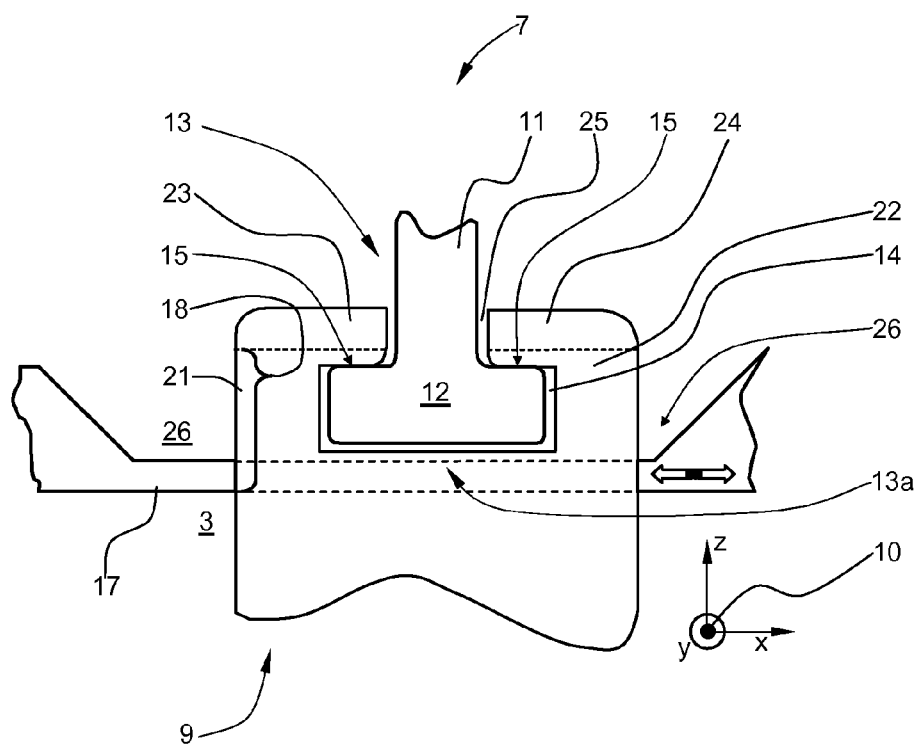
FIG. 3 shows a plan view of the fuselage cell fitment with the cargo door fitment received therein.

FIG. 3 shows a view of the fuselage cell fitment 9 connected to the fuselage cell 3, with the cargo door fitment 7 received therein wherein the coordinate system 10 shows the orientation in space.

The cargo door fitment 7 comprises the handle 11 with the handle end 13 which changes into the toggle 12. The toggle 12 is received in the recess 14 of the fuselage cell fitment 9 with positively locking engagement in at least some areas. The fuselage cell fitment 9 furthermore comprises two arms 21, 22 designed mirror symmetrical with one another and each changing into an overlocking end 23, 24 wherein the overlocking ends 23, 24 are each arranged tilted by roughly +/−90° in relation to the arms 21, 22. The overlocking ends 23, 24 secure the toggle 12 against being drawn out in the direction of the z-axis, thus in the main active direction of the engaging peripheral loads which are transferred by means of the load transfer surface 15 from the cargo door fitment 7 to the fuselage cell fitment 9. Between the overlocking ends 23, 24 there is an elongated opening 25 through which the handle 11 of the cargo door fitment 7 can be inserted into the fuselage cell fitment 9 or is swivelled therein on closing the cargo door 1.

The sliding element 17 is as shown by the white double arrow received with sliding movement in the horizontal guide 18. The sliding element 17 has trapezoidal recesses 26 arranged at regular intervals which correspond substantially to the spacing of the cargo door fitments 7 and fuselage cell fitments 9 (parallel to the x-axis). If the trapezoidal recess 26 is located in the area of the fuselage cell fitment 9, as shown in the illustration in FIG. 3, the cargo door fitment 7 can swivel out from the fuselage cell fitment 9 and the cargo door 1 can be opened. If on the other hand the sliding element 17 is moved in the horizontal direction so that the trapezoidal recess 26 lies outside of the fuselage cell fitment 9 then the cargo door fitment 7 and the fuselage cell fitment 9 are locked together and opening the cargo door 1 is no longer possible.

Figure 4:
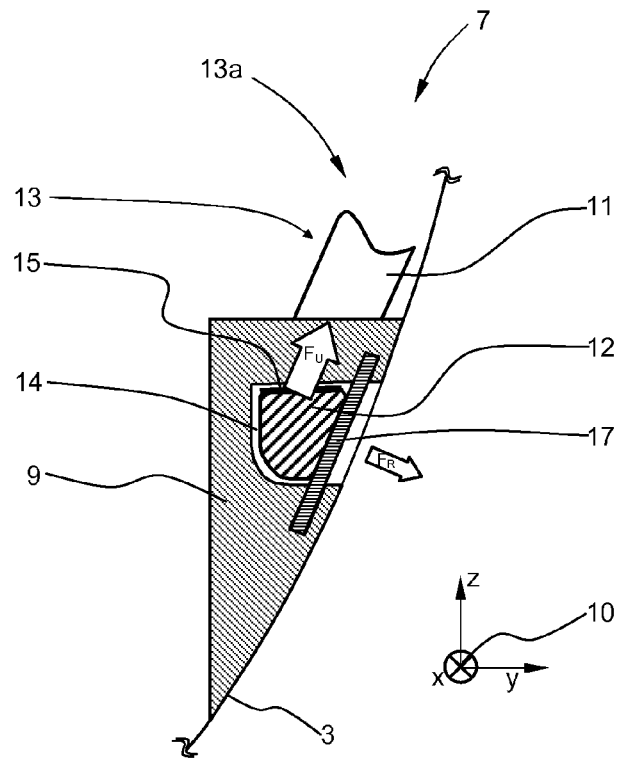
FIG. 4 shows a cross-section through the fuselage cell fitment with the cargo door fitment received therein in the closed and locked state of the cargo door.

FIG. 4 shows a cross-sectional illustration of the fuselage cell fitment 9 with the cargo door fitment 7 housed and locked therein. As opposed to the illustration in FIG. 2 the cargo door fitment 7 is received in the fuselage cell fitment 9 completely by producing a positive locking engagement at least in some areas between the recess 14 and the toggle 12 to form the load transfer surface 15 and is additionally locked by means of the sliding element 17. The movement of the sliding element 17 for the purpose of the locking action hereby takes place substantially parallel to the x-axis of the coordinate system 10, that is parallel to the flight direction of the aircraft. The transfer of the significant peripheral loads FU takes place by means of the load transfer surface 15 whilst the radial loads FR are essentially directed from the sliding element 17 into the structure.

Figure 5:
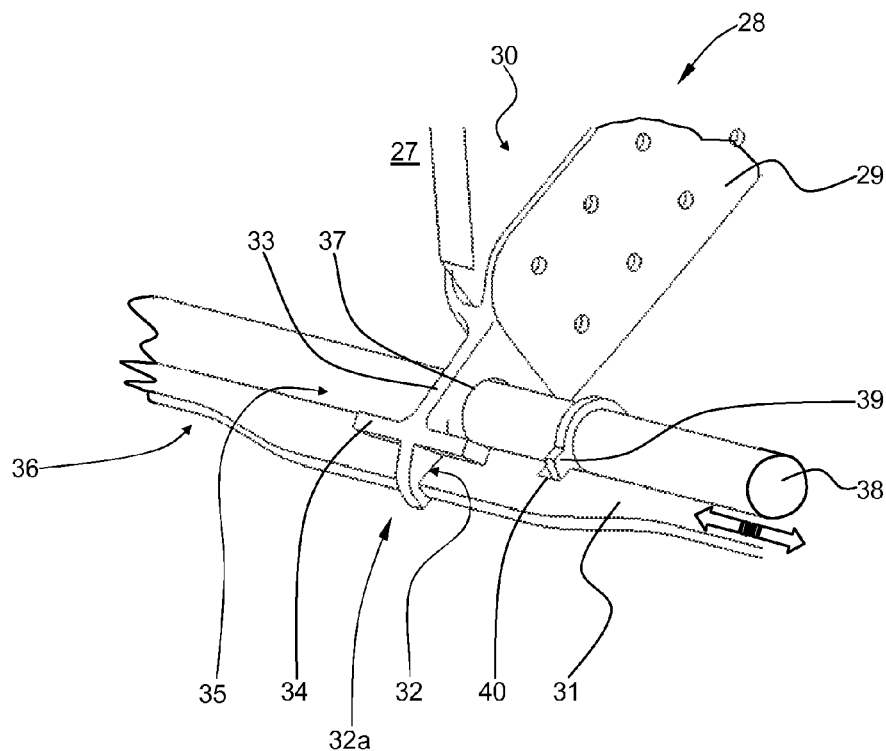
FIG. 5 shows a perspective view of the cargo door fitment with a security bar fitted therein.
Figure 6:
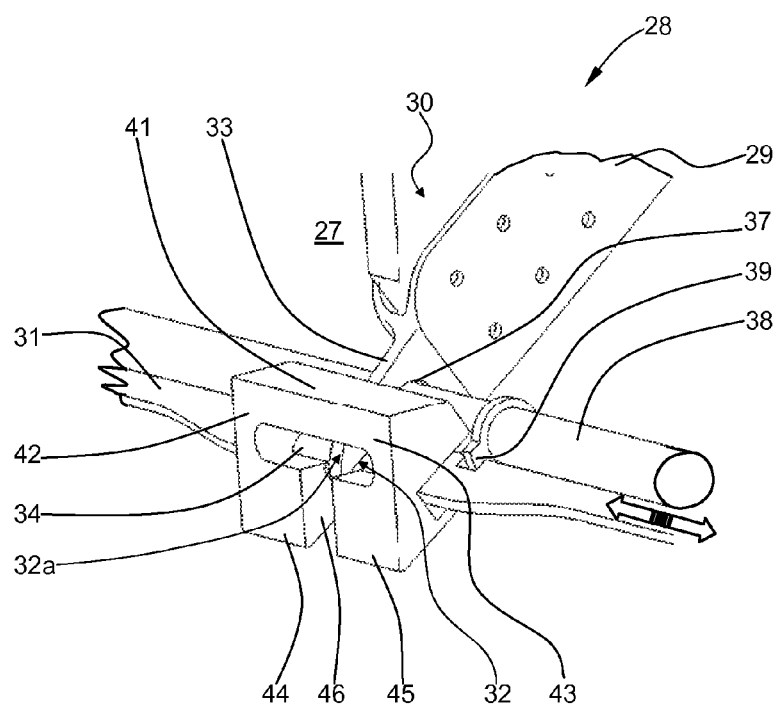
FIG. 6 shows a perspective view of the cargo door fitment received in the fuselage cell fitment.
Figure 7:
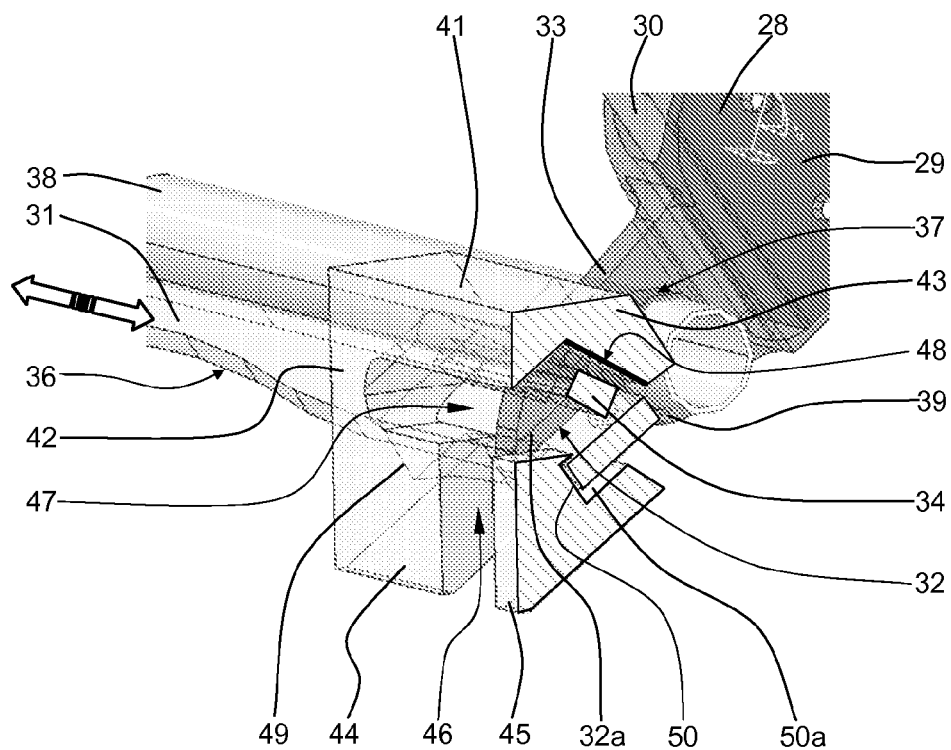
FIG. 7 shows a perspective partial sectional view of the fuselage cell fitment with the cargo door fitment received therein.

Reference is further made equally to FIGS. 5 to 7.

FIG. 5 shows a perspective view of a version of a cargo door fitment in the locked state with a security bar housed therein without the fuselage cell fitment.

A substantially T-shaped cargo door fitment 28 mounted on a cargo door 27 has a bracket plate 29 for fixing on a former 30. Different from the embodiment of FIGS. 1 to 4 and FIG. 9, 10, a sliding element 31 for the locking mechanism is housed displaceable in the direction of the white double arrow in a horizontal guide 32 having an approximately rectangular cross-sectional geometry which is mounted in the cargo door fitment 28 and not in the fuselage cell fitment. The sliding element 31 hereby follows the opening movement of the cargo door 27. The structural design of the horizontal guide 32 corresponds to the horizontal guide 18 of the first embodiment. The cargo door fitment 28 corresponding to the cargo door fitment 7 in turn has a retaining tie 32a with a handle 33 and a toggle 34 which is mounted in the area of the handle end 35. The sliding element 31 has several trapezoidal recesses arranged evenly spaced from one another, of which the trapezoidal recess 36 as representative of the others is provided with a reference numeral. Of the trapezoidal recess 36 only a left or right section with a transitional slope is visible in FIGS. 5-7. An interval between the trapezoidal recesses 36 corresponds preferably to the former spacing of the fuselage cell 3.

In a further difference from the cargo door fitment 7 (see FIGS. 2-4) the cargo door fitment 28 has a bore 37 in which an additional or optional security bar 38 with security cam 39 is housed for swivel movement. By swivelling the security bar 38 the security cam 39 can be brought into a small security recess 40 in the sliding element 31. This security mechanism prevents horizontal displacement of the sliding element 31 and thus accidental opening of the cargo door 27 as a result of unintended displacement of the sliding element 31. The swivelling of the security bar 38 is carried out by a mechanism (not shown).

FIG. 6 shows a fuselage cell fitment 41 with the cargo door fitment 28 housed therein (see FIG. 5), in a perspective view in the closed and locked state of the cargo door 27.

The substantially forked-shaped fuselage fitment 41 has two arms 42, 43 which change into overlocking ends 44, 45. An elongated opening 46 runs between the arms 42, 43. The security bar 38 with the security cam 39 is housed with swivel action in the bore 37 in the cargo door fitment 28. Furthermore the sliding element 31 is housed with sliding action in the substantially rectangular shaped horizontal guide 32 which is likewise located in the cargo door fitment 28. A displacement of the sliding element 31 in the direction of the white double arrow is for security reasons only possible when the security cam 39 is located outside of the security recess 40. The retaining tie 32a of the cargo door fitment 28 is received in a recess 47 (see FIG. 7) of the fuselage fitment 41 with positive locking engagement in at least some areas thereby producing the locking mechanism for the cargo door 27.

FIG. 7 corresponds to the illustration in FIG. 6 but a right-hand part of the fuselage fitment 41 has been cut away.

The toggle 34 of the retaining tie 32a is received in the recess 47 with positive locking engagement in at least some areas whilst providing a load transfer surface 48 within the fuselage fitment 41. Where necessary compensating plates (so called "shim" plates) can be fitted into the recess 47 in order to adjust the locking mechanism. The peripheral loads of the fuselage cell which make up the main part of the mechanical load of the locking mechanism are directed over the load transfer surface 48. Between this load transfer surface 48 and the toggle 34 thin "shim" plates (not shown) are inserted where necessary to adjust or compensate for the tolerance of the locking mechanism. Securing the toggle 34 in the fuselage cell fitment 41 in the closed state of the cargo door 27 is carried out by means of the sliding element 31 which fits in the two grooves 49, 50 in the opposing arms 42, 43. If the sliding element 31 is moved in the direction of the white double arrow then the toggle 34 can swivel out from the fuselage cell fitment 41 since the recess 36 of the sliding element 31 is displaced into the area of the fuselage cell fitment 41 and thus is no longer housed in the two grooves 49, 50. In this position the toggle 34 can be swivelled out from the recess 47 and the cargo door 27 can be opened. This horizontal displacement of the sliding element 31 is however only possible when the security mechanism in the form of the security cam 39 and the security recess 40 is not activated or by slightly turning the security bar 38 the security cam 39 was swivelled out from the security recess 40 of the sliding element 31. For adjusting the locking mechanism in the radial direction "shim" plates (not shown) of slight material thickness can be inserted between the sliding element 31 and the surface 50a.

Figure 8:
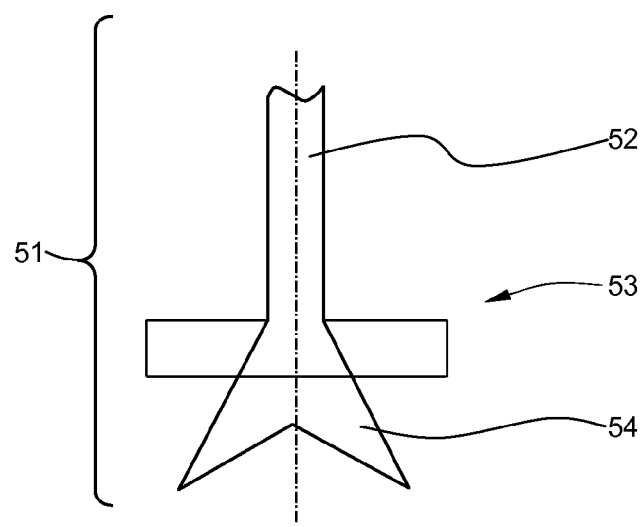
FIG. 8 shows an alternative embodiment of the tie for a cargo door fitment.

FIG. 8 shows an alternative embodiment of a retaining tie 51 of a toggle mounted on a handle 52 in the region of the handle end 53. Different from the toggles previously described the toggle 54 is however dovetailed in shape, that is formed slightly V-shaped whereby a self centring action in the fuselage cell fitment takes place as the cargo door is closed.

Figure 9:
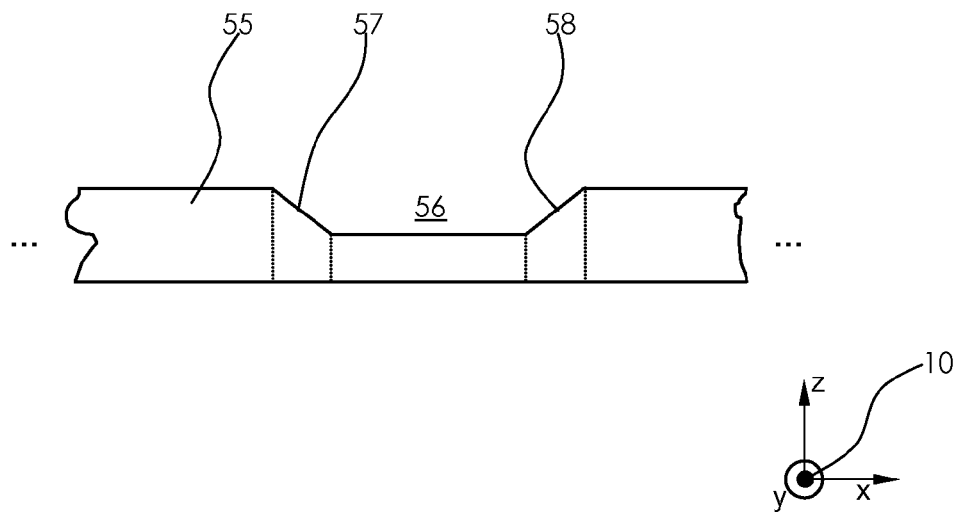
FIGS. 9, 10 show an alternative design of a sliding element with a cargo door fitment.
Figure 10:
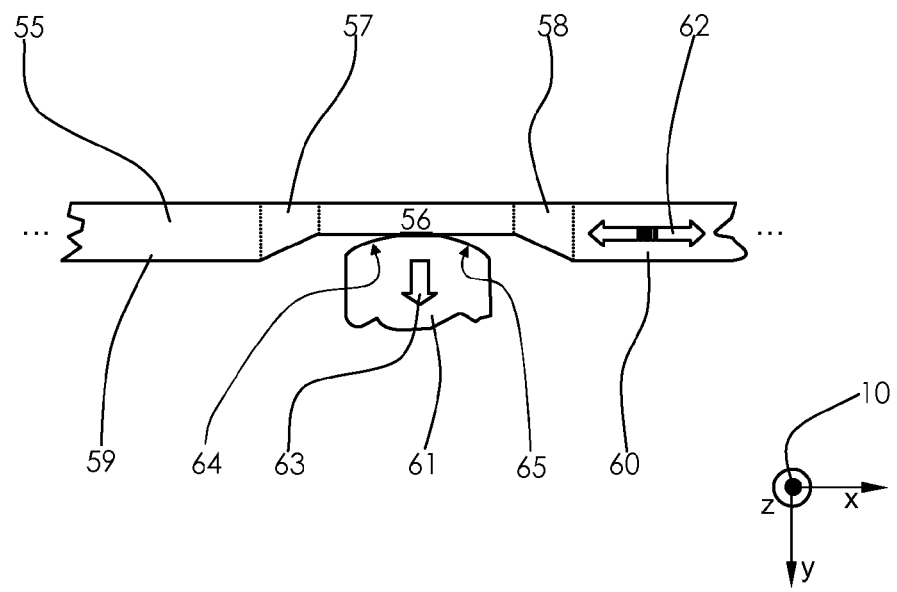

FIGS. 9 and 10 show a diagrammatic illustration of a section of an embodiment of a sliding element 54. The coordinate system 10 in turn shows the position of the components in space.

The sliding element 55 has a trapezoidal recess 56 with two preferably identically inclined linear slopes 57, 58. Furthermore the sliding element 55 is provided with two thickened areas 59, 60 either side of the trapezoidal recess 56 with transitional inclines (not shown) whereby in conjunction with the slopes 57, 58 a cargo door fitment 61 is guided or "drawn" into a fuselage cell fitment (not shown) in the vertical direction parallel to the arrow 63 by sliding the sliding element 55 horizontally in the direction of the arrow 62.

The cargo door 1 in the already practically closed state can hereby be moved into the fully closed and locked state by sliding the sliding element.

For easier pulling the cargo door fitment 61 can be provided optionally with transitional run-up faces 64, 65 arranged on either side and in this case preferably curved spherical or formed flat.

The sliding element 55 continues periodically on either side, as shown by the dots or break lines, whereby the number of recesses preferably corresponds to the number of cargo door fitments to be locked.

Figure 11:
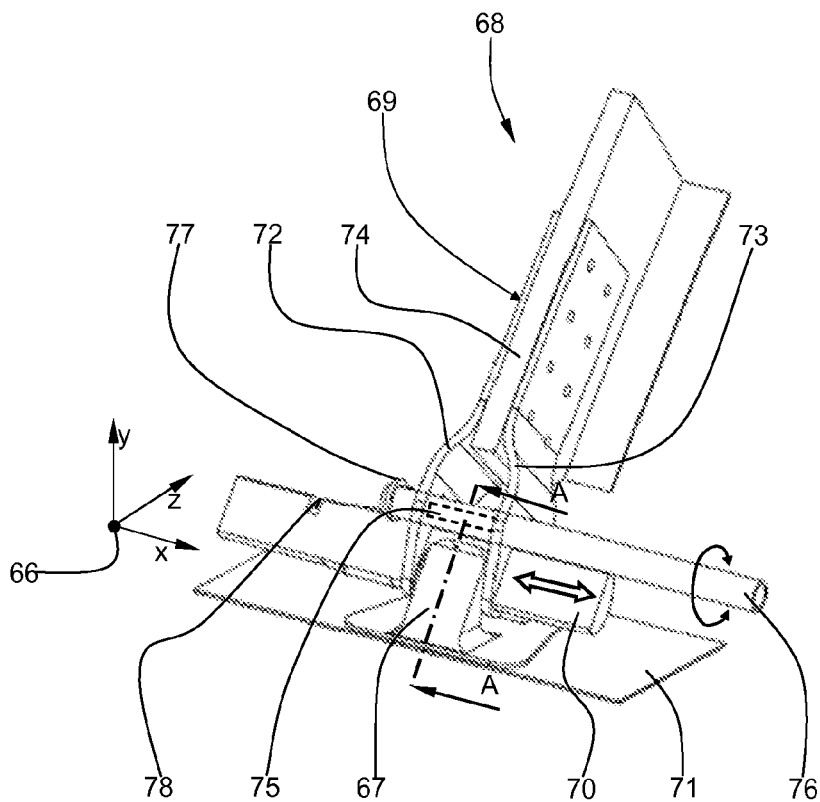
FIG. 11 shows a perspective view of an alternative embodiment of the locking mechanism.

FIG. 11 shows an embodiment of the locking mechanism in the fully closed state in an isometric view.

A coordinate system 66 shows the position of the individual components in space. The locking mechanism comprises inter alia a fuselage cell fitment 67, a cargo door fitment 68, which is connected to the cargo door (not shown) and in this embodiment version different from the toggle-shaped cargo door fitment 7 of the first embodiment is formed as a forked fitment 69, and a sliding element 70. The fuselage cell fitment 67 is connected to the fuselage cell (not shown) of the aircraft in the area of a loading edge 71 thereof, and the sliding element 70 for securing the cargo door against unintended opening is housed in the forked fitment 69 displaceable parallel to the x-axis of the coordinate system 67 as shown by the white double arrow. The cargo door fitment 68 or the forked fitment 69 is fixed in the area of a lower edge (not shown) of the cargo door. The forked fitment 69 has two arms 72, 73 spaced from one another and running substantially parallel (forked fitment arms), of which the rivet ends (not marked in) are connected to a former 74 of the cargo door. The two arms 72, 73 are connected in a lower section to a web 75 running horizontally between the arms 72, 73 wherein the web 75 interacts with positive locking engagement in at least some areas with the substantially hook-shaped fuselage cell fitment 67 in the closed state of the cargo door. A cross-sectional geometry of the sliding element 70 differing from the first embodiment of the locking mechanism corresponds substantially to a circular section. Alternatively the sliding element 70 can however also have an approximately rectangular cross-sectional geometry (see for example FIG. 2).

In the lower section of the forked fitment 69 there is a swivel-mounted hollow cylindrical security bar 76 which runs parallel to the x-axis of the coordinate system 66 and to the sliding element 70 and whose function corresponds to the security bar in the first embodiment. The security bar 76 is hereby able to swivel about the x-axis. On the security bar 76 there is a security cam 77 which in the locked state of the cargo door can be brought into a security recess 78 of the sliding element 70 in order to prevent this from sliding horizontally in the locked state. To make up the locking mechanism of a cargo door designed according to the invention there are as a rule four to nine fuselage cell fitments and a corresponding number of cargo door fitments. Basically one security cam can be provided on the full-length security bar in the area of each forked fitment 69. For minimum security basically one security cam 77 is sufficient on the security bar 76 and one security recess 78 in the sliding element 70.

Figure 12:
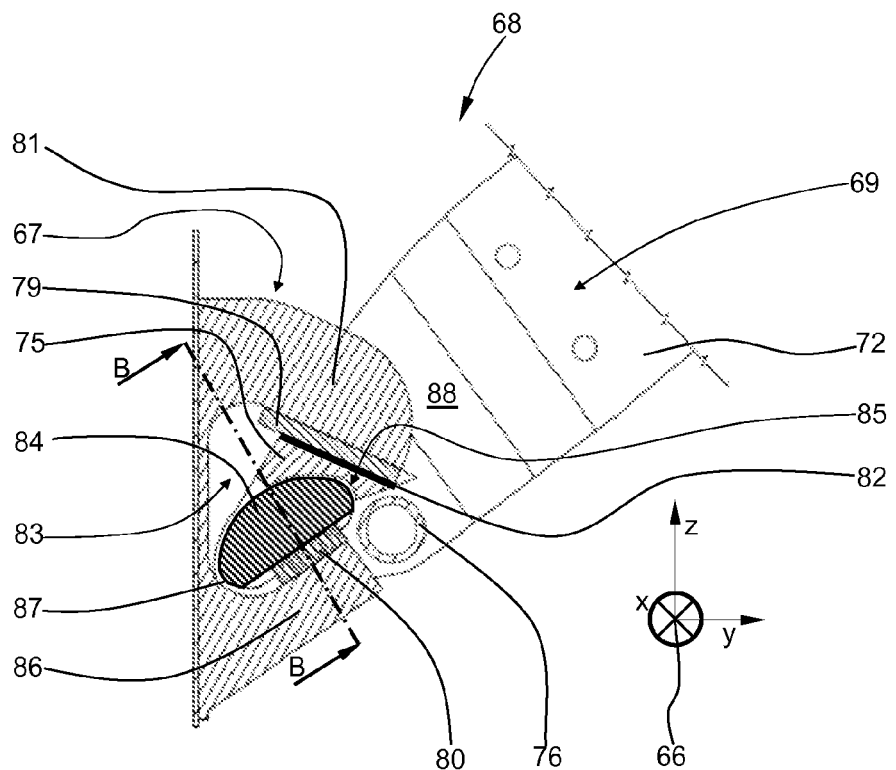
FIG. 12 shows a sectional view in a closed and locked position along the sectional line A-A in FIG. 11.
Figure 13:
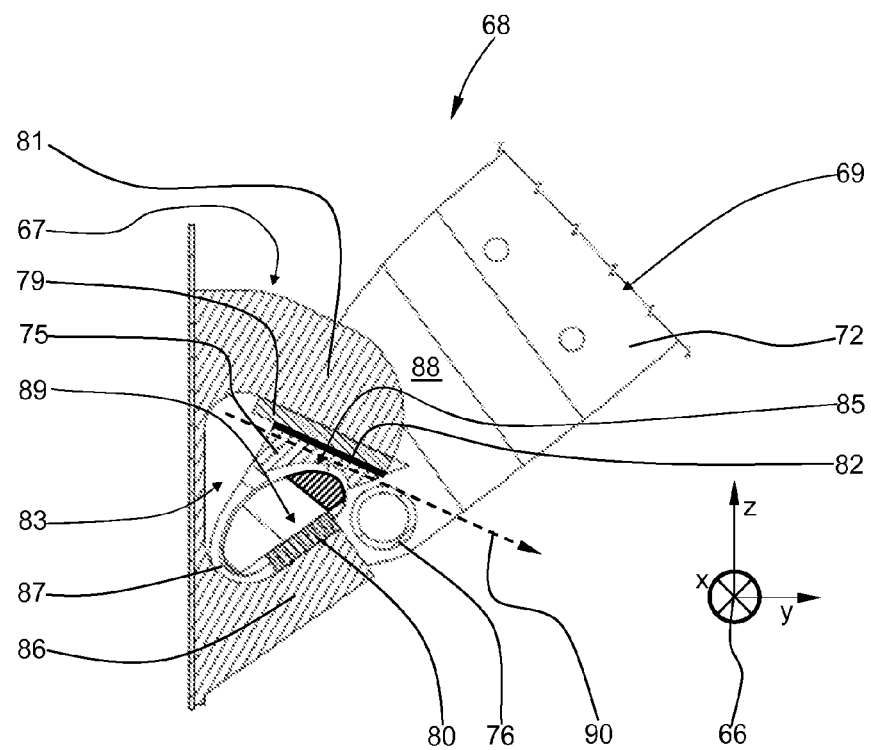
FIG. 13 shows a sectional view in a closed and unlocked position along the cross-sectional line A-A in FIG. 1.

FIGS. 12 and 13 to which reference is also made, show a sectional view through a cargo door fitment 68 along the sectional line A-A in FIG. 11. FIG. 12 shows the cargo door fitment 68 in the closed position locked with the sliding element 70 whilst FIG. 13 shows the cargo door fitment in the unlocked but not yet opened position.

In the forked fitment 69 there are two shim plates 79, 80 provided for tolerance compensation. Between the web 75 of the forked fitment 69 or its arm 72 as well as the arm 73 (not visible here) and a hooked section 81 of the fuselage cell fitment 67 the force transfer between the fuselage cell fitment 67 and the forked fitment 69 fixed on the cargo door takes place over a load transfer surface 82 formed by the upper shim plate 79 and the hooked section 81. Differing from the embodiment illustrated the load transfer surface 82 can also be formed curved in one or both directions in space.

The forked fitment 69 is prevented from swivelling out—as shown by the arrow in dotted lines in FIG. 13—from a roughly triangular shaped opening 83 in the fuselage cell fitment 67 by the sliding element 70 whose slightly convex thickened area 84 interacts with a correspondingly formed (slightly concave) recess 85 in the web 75 in this position.

The sliding element 70 bears on the lower shim plate 80 or on a contact bearing arm 86 of the fuselage cell fitment 67. The guide for the sliding element 70 is provided in recesses in the lower areas of the arms 72, 73 of the forked fitment 69, of which only one recess 87 is visible in FIGS. 12, 13.

The security bar 76 can in the illustrated position in FIG. 12 be brought into the locked or unlocked position selectively by swivelling about the x-axis of the coordinate system 66.

Both the sliding element 70 and the security bar 76 are guided and received in the lower area 88 of the arms 72, 73 in correspondingly shaped recesses.

In FIG. 13 the sliding element 70 is located in a position displaced parallel to the x-axis in relation to the position of FIG. 12 whereby a recess 89 in the sliding element 70 (see FIG. 14) is brought into the area of the contact bearing arm 86. The cargo door (including the cargo door fitment 69 with the web 75 and the sliding element 70) can hereby be opened past the contact bearing arm 86 and the shim plate 80, as shown simply by the opening curve 90.

Figure 14:
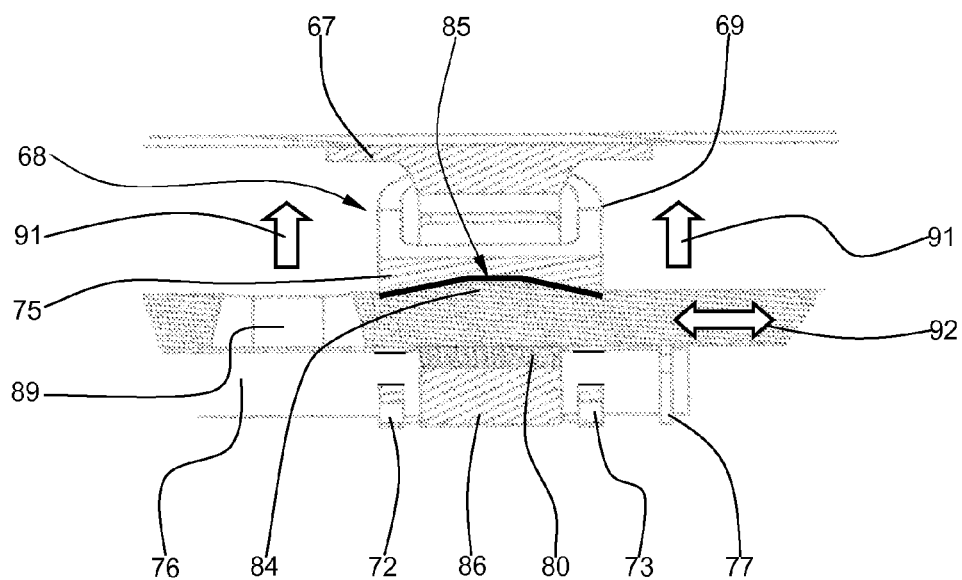
FIG. 14 shows a cross-sectional view along the line B-B in FIG. 12.

FIG. 14 illustrates a section through the cargo door fitment 68 along the sectional line B-B of FIG. 12 (locked state).

The sliding element 70 has a trapezoidal (convex) thickened area 84 which interacts with the correspondingly formed (concave) recess 85 in the web 75. As a result of the design of the thickened area 84 and recess 85 previously described the sliding element 70 is pressed by a force acting in the direction of the two vertical arrows 91 and which is essentially caused by the excess pressure prevailing in the fuselage cell during flying, into a force fit in the recess 85 of the forked fitment 69 which becomes stronger as the pressure rises so that a tendency for the displacement movements of the sliding element 70 parallel to the horizontal arrow 91 which arise for example through loads acting parallel to the x-axis on the sliding element 70, is securely prevented irrespective of activation of the locking mechanism by means of the security bar 76. Such forces acting on the sliding element 70 can for example arise through shear movements of the fuselage cell already during normal flying operation. The geometrical configuration of the thickened area 84 and of the recess 85 can be anything within wide limits, so long as an at least in some areas positive locking engagement prevents tendencies of the sliding element 70 to move in the direction of the arrow 92 (parallel to the x-axis).

Both the sliding element 70 and the security bar 76 with the security cam 77 are guided in suitably shaped recesses (not shown) in the lower areas of the two arms 72, 73 of the forked fitment 69. The number of thickened areas 84 and recesses 85 on the sliding element 70 preferably corresponds to the number of fuselage cell fitments and the cargo door fitments or forked fitments used for the locking mechanism. In order to minimise friction losses and wear the sliding element 70 is preferably formed with a bronze alloy. Alternatively the sliding element 70 can also be formed with a high-tensile aluminium alloy, with titanium alloy or with stainless steel alloy which can be coated with Teflon® to minimise friction and wear.

The second variation of the locking mechanism according to FIGS. 11 to 14 enables additional security against uncontrolled opening of the cargo door which is achieved through the force-fit of the sliding element 70 in the (transverse) web 75 of the forked fitment 69 which automatically strengthens as the pressure is increased.

A geometrical configuration of the sliding element 70 can be selected so that the geometry of the sliding element in the non-installed state deviates from that in the assembled state through elastic deformation so that a latent tendency of the sliding element 70 to displacements parallel to the x-axis of the coordinate system 66 is straightaway eliminated even in the non-pressurised state of the fuselage cell. The sliding element 70 can in this design version only be moved or inserted into the recesses of the forked fitment arms of the forked fitments by overcoming this geometry-conditioned pretension.

FIGS. 15 to 19 illustrate a further alternative embodiment of the cargo door locking mechanism according to the invention. Differing from the version according to FIGS. 11 to 14 the web of the forked fitment no longer serves for automatically securing the sliding element against horizontal displacements in the case of the pressure-loaded fuselage cell. Furthermore a roller element facilitates the sliding or rolling of the sliding element in the recesses of the forked fitment. The coordinate system 93 shows the position of all components in space.

Figure 15:
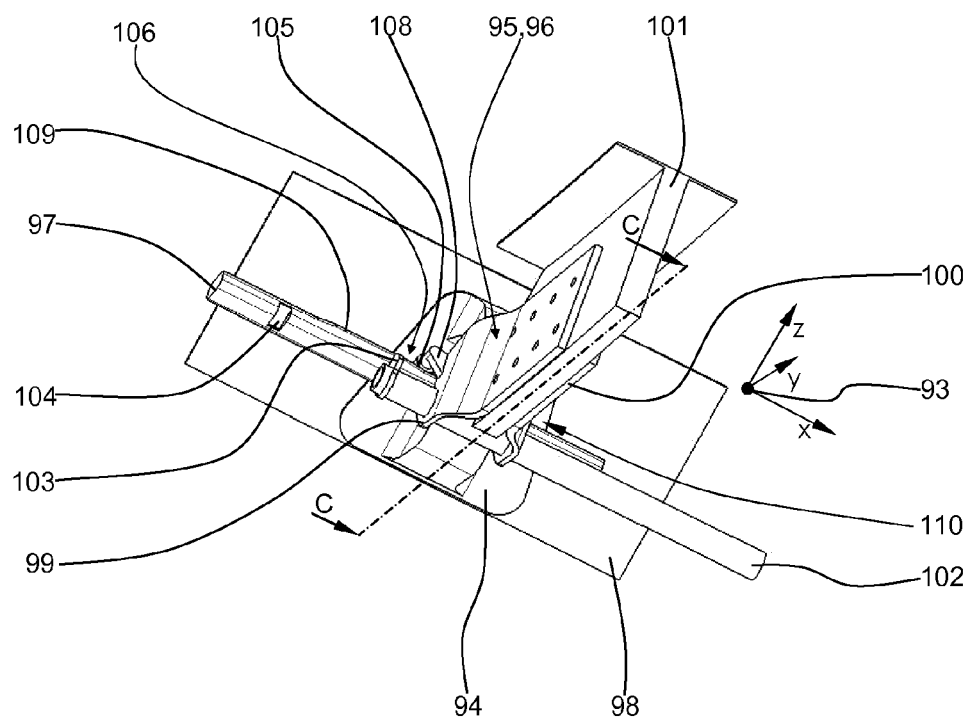
FIG. 15 shows a perspective view of a further alternative design in the fully opened and unlocked position.
Figure 16:
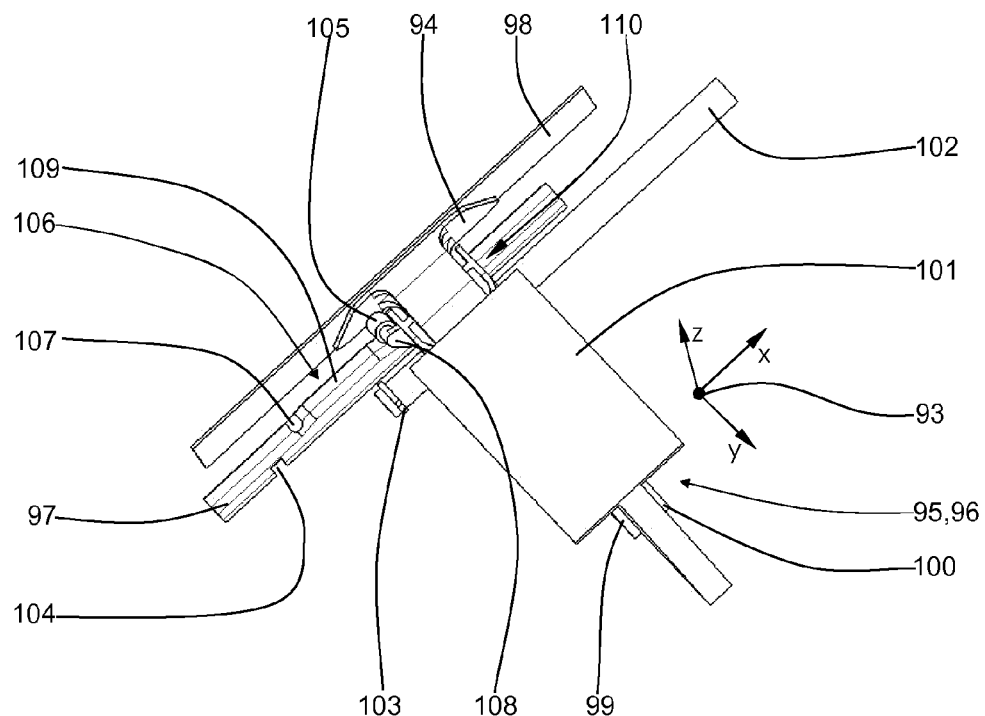
FIG. 16 shows a perspective view of the cargo door locking mechanism from below in the fully closed and locked position.

The cargo door locking mechanism shown perspectively in different views in FIGS. 15 and 16 and to which reference is further made comprises inter alia a fuselage cell fitment 94, a cargo door fitment 95 which is connected to the cargo door (not shown) and which is designed corresponding to the previous design version again as a forked fitment 96, as well as a sliding element 97 for locking the cargo door. The fuselage cell fitment 94 is mounted in the area of a loading edge 98 of the aircraft fuselage cell. The sliding element 97 is housed in recesses inside the arms 99, 100 of the forked fitment 96 (concealed in FIGS. 15, 16) displaceable parallel to the x-axis of the coordinate system 93. Both upper ends of the arms 99, 100 of the forked fitment 96 are connected to a former 101 of the cargo door. A cross-sectional geometry of the sliding element 97 corresponds at least outside of the trapezoidal recesses, which allow the forked fitment 96 to swivel out from the cargo cell fitment 94, roughly to that of a rectangle with slightly rounded corner areas. Fundamentally the sliding element 97 can also have a cross-sectional geometry deviating from this.

Both arms 99, 100 are connected in an area not marked to a web concealed in FIGS. 15, 16. In the lower area of the arms 99, 100 there is a security bar 102 which runs parallel to the sliding element 97 and is able to swivel about the x-axis and has a security cam 103 which interacting with a security recess 104 in the sliding element 97 prevents the sliding element 97 from sliding horizontally (parallel to the x-axis).

Different from the previous embodiments at least one roller element 105 is mounted on the forked fitment 96 and rolls on a surface 106 of the sliding element 97 to guarantee smooth actuation of the sliding element 97 under all operating conditions of the aircraft, more particularly icing up of the cargo door fitment 94. Furthermore the roller element 105 reduces excessive wear of the sliding element 97 guided in recesses in the lower areas of the arms 99, 100, since during actuation of the sliding element 97 as it slides horizontally it is "lifted up" by a small amount by means of the roller element 105 from the edges of the recesses in the arms 99, 100. Furthermore a closing recess 107 is let into a surface 106 of the sliding element 97, with its surface geometry designed essentially to correspond to the roller element 105. On reaching the locked state the roller element 105 rolls into the closing recess 107 and thus gives the sliding element 97 at the same time a tangible and defined closing point. In order for the roller element 105 to roll out of the closing recess during the opening or unlocking process of the cargo door it is thus necessary to overcome a slight counter force. The closing recess 107 is preferably designed as a hollow groove with a substantially semi circular shaped cross-sectional geometry whose radius roughly coincides with the radius of the roller element 105. The roller element 105 can be by way of example a needle bearing which is fixed by a forked holder 108 on the arm 99. A needle bearing enables in an advantageous way small radial dimensions of the roller element 105 whereby a compact structure is possible. As an alternative the roller element 105 can also be positioned between two arms 99, 100. The closing recess 107 which is a new addition in the third design version is formed in the area of an inclined flank (not marked in FIGS. 15, 16) of a trapezoidal thickened area 109 of the sliding element 97. A roughly trapezoidal recess 110 inside the sliding element 97, which is concealed in FIGS. 15, 16 (see instead in particular FIGS. 17, 18) has corresponding to the previously design versions of the cargo door locking mechanism a depth and width such that the cargo door fitment 95 when the recess 110 is positioned in the unlocked state between the arms 99, 100 of the cargo door fitment 95, becomes free in relation to the fuselage cell fitment 94 and can swivel out from this.

Figure 17:
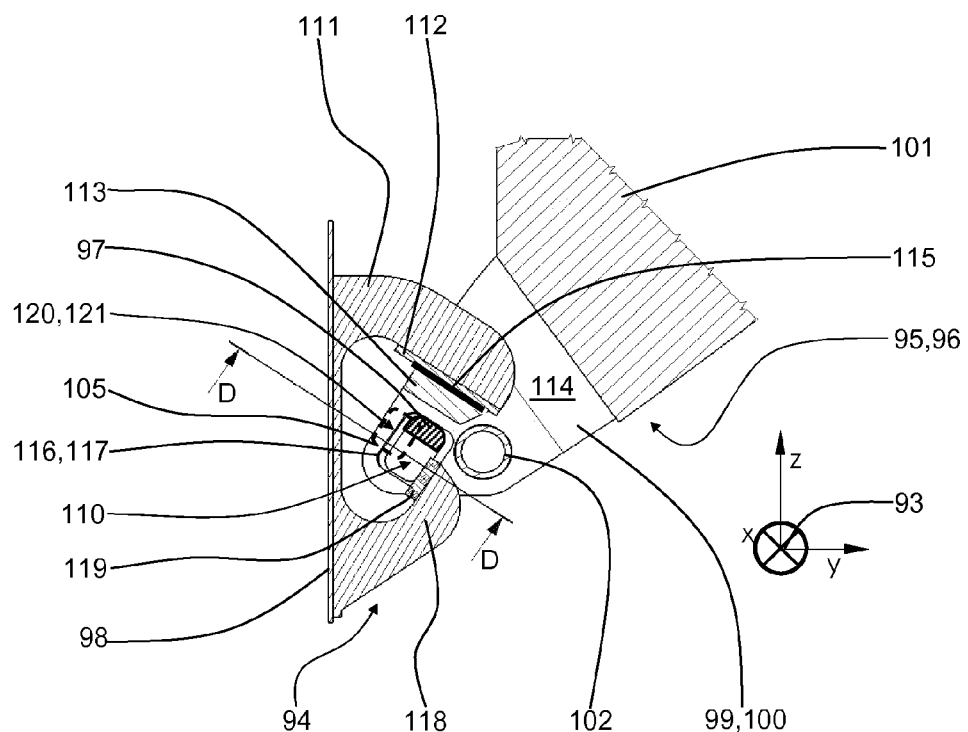
FIG. 17 shows a cross-sectional view long the line C-C in the unlocked position.
Figure 18:
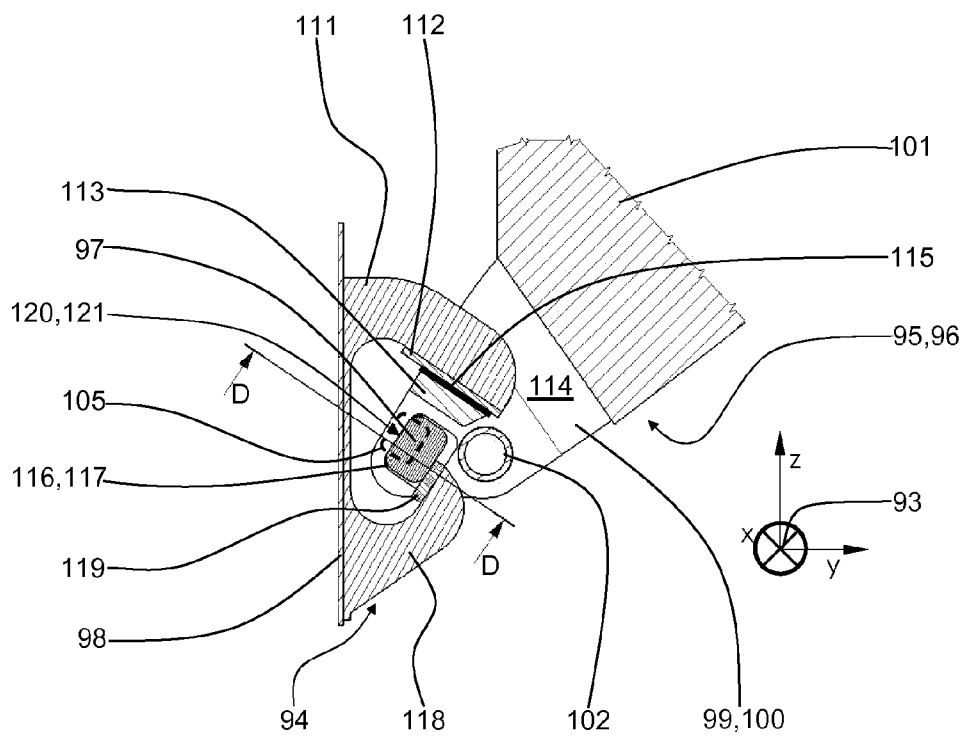
FIG. 18 shows a cross-sectional view along the line C-C in the locked position.
Figure 19:
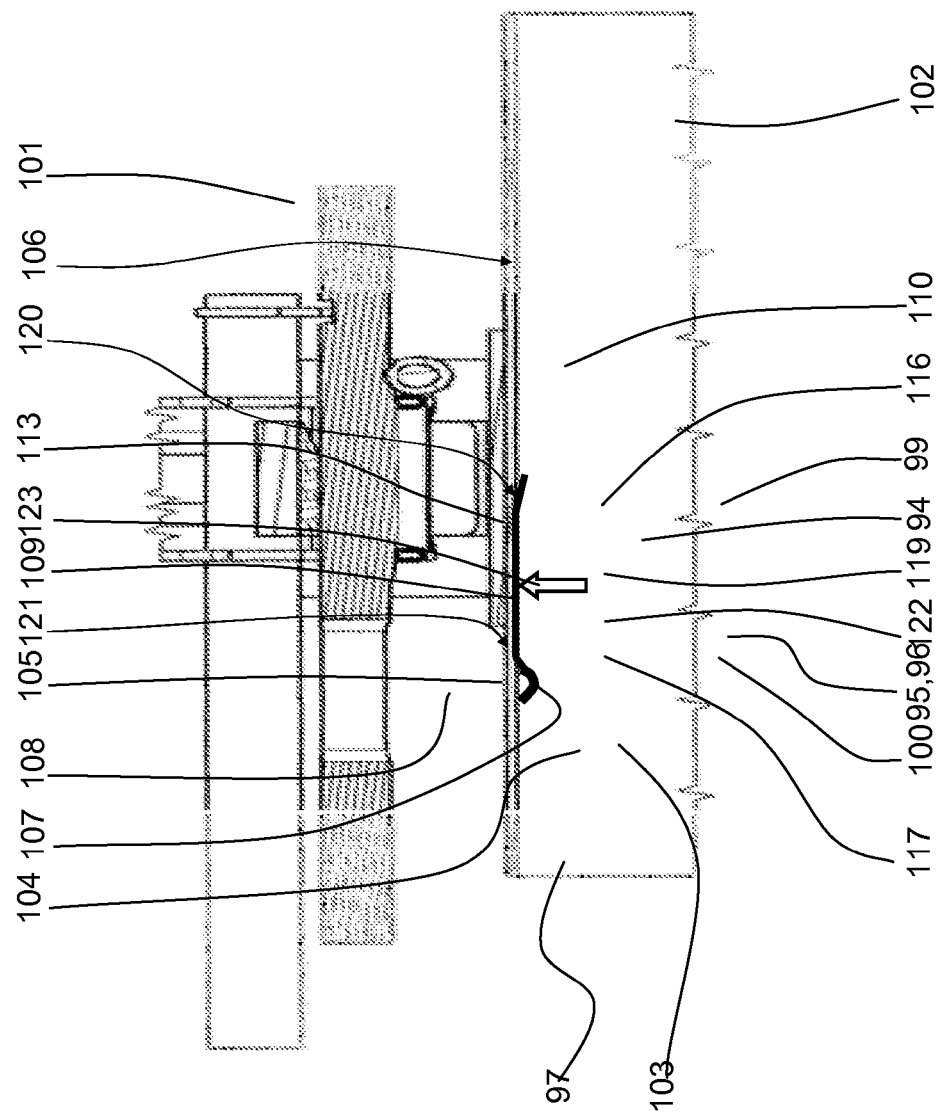
FIG. 19 shows a cross-sectional view along the line D-D in the locked position.

FIG. 17 shows a cross-sectional view of the cargo door locking mechanism along the sectional line C-C marked by dashed lines in FIG. 15, whilst FIG. 18 shows the same cross-section but in the closed and locked position of the cargo door locking mechanism. FIGS. 17, 18 show the position of the roller element 105 in diagrammatic form marked by a rectangle with rounded corners shown in dotted lines. FIG. 19 shows a sectional view along the sectional line D-D marked by solid lines in FIGS. 17, 18 in the closed and locked state. For the rest of the description reference is made to FIGS. 17 to 19.

The fuselage cell fitment 94 has a hooked section 111. In the area of the hooked section 111 there is a first shim plate for compensating tolerances. Both arms 99, 100 of the cargo door fitment 95 and forked fitment 96 are connected by a (transverse) web 113 in a lower area of the cargo door fitment 95. The web 113 and the hooked section 111 form a load transfer surface 115 over which essentially only the peripheral loads in the fuselage cell, which however as a rule make up to 90% of the overall load of the cargo door fitment 95, are directed, whereby the force vectors in this embodiment ideally are practically perpendicular to the load transfer surface 115. Furthermore the arms 99, 100 each have a roughly rectangular recess 116, 117 wherein the cross-sectional geometries of the recesses 116, 117 are each formed corresponding, where necessary with the provision of a slight clearance, to the non-tapered section of the sliding element 97 (i.e. outside of the recess 110 or recesses), in which the sliding element 97 is housed displaceable parallel to the x-axis. It can furthermore be seen from FIG. 17 that the recess 110 of the sliding element 97 makes up more than 50% of the available (overall) cross-sectional surface area of the sliding element 97. The fuselage cell fitment 94 furthermore has a lower contact bearing arm 118 on which a second shim plate 119 is mounted and fixed. If the recess 110 is located in the area of the contact bearing arm 118 the cargo door fitment 95 can be swivelled out from the fuselage cell fitment 94 and the cargo door as a whole can be opened. If however the sliding element 97 is displaced parallel to the x-axis so far that the recess 110 lies completely outside of the fuselage cell fitment 94 or cargo door fitment 95 (see in particular FIG. 18) then the cargo door fitment 95 and thus the cargo door (not shown) can no longer be swivelled out from the fuselage cell fitment 94, and the cargo door is closed and locked.

The fuselage cell fitment 94 is connected to the loading edge 98 of the fuselage cell whilst the cargo door fitment is fixed to a former 101 of the cargo door. The security bar 102 serves as additional securing means against horizontal displacements of the sliding element 97 parallel to the x-axis independently of the self-securing function of the sliding element 97 in the pressure-loaded state of the fuselage cell wherein the additional securing of the sliding element 97 is achieved by swivelling the security bar 102 about the x-axis of the coordinate system 93.

Differing from the design version according to FIGS. 11 to 14 the self-securing action of the sliding element 97 against horizontal displacements is no longer by means of the web 113 which is mounted between the arms 99, 100 of the forked fitment 96. Rather the self-securing action of the sliding element 97 which is detached from the function of the security bar 102, as shown in particular in FIG. 19, takes place in the event of the fuselage cell being under excess pressure, through the roughly trapezoidal shaped thickened area 109 in the area of the surface 106 of the sliding element 97 with slightly inclined flanks, not marked in further detail, wherein the flanks adjoin the thickened area 109 either side in mirror symmetrical fashion.

According to the invention as the pressure on the fuselage cell rises so the thickened area 109 is pressed increasingly between the arms 99, 100 of the forked fitment 96, wherein the flanks of the thickened area 109 interact with the edges 120, 121 of the recesses 116, 117 in the arms 99, 100 providing a light press-fit engagement so that a horizontal displacement of the sliding element 97 in the case of a pressure-loaded fuselage cell is impossible independently of the security bar 102. The second shim plate 119 has on at least one side a slight incline to facilitate the sliding action of the sliding element 97.

The number of thickened areas and recesses corresponds to the number of cargo door fitments and fuselage cell fitments which are used to implement the cargo door locking mechanism according to the invention in a concrete case.

Furthermore it can be seen in the fully closed and locked position of the cargo door locking mechanism illustrated in FIG. 19 that the roller element 105 forms a positive locking engagement in at least some areas with the closing recess 107 in order in the closed and locked state of the cargo door to provide a defined "tangible" closing point which can only be overcome again by applying a defined counter force. Furthermore during unlocking by horizontally sliding the sliding element 97 the sliding element 97 and thus the cargo door fitment 95 and cargo door is "lifted" away from the edges 120, 121 by a small amount lengthwise (i.e. as a rule only some few tenths millimeters) in the direction of the white double arrow 123, i.e. is pressed outwards, whereby the wear of the sliding element 97 in the contact area with the edges 120, 121 within the recesses 116, 117 of the forked fitment 96 is prevented, and a smooth easy running jam-free action of the sliding element 97 is ensured in all operating conditions of the aircraft, particularly at low temperatures and in icy conditions.

Conversely during the locking process the cargo door is automatically pressed back into the cargo door recess of the fuselage cell by a small amount in order to reach a defined closing position again in the fully locked state.

LIST OF REFERENCE NUMERALS

1 Cargo door
2 recess (fuselage cell)
3 fuselage cell
4 former (cargo door)
5 hinge
6 lower edge (cargo door)
7 cargo door fitment
8 loading edge (fuselage cell)
9 fuselage cell fitment
10 coordinate system
11 handle
12 toggle
13 handle end
13a retaining tie
14 recess (fuselage cell fitment)
15 load transfer surface
16 arrow
17 sliding element
18 horizontal guide (sliding element)
19 groove
20 groove
21 arm (fuselage cell fitment)
22 arm (fuselage cell fitment)
23 overlocking end (fuselage cell fitment)
24 overlocking end (fuselage cell fitment)
25 longitudinal opening
26 trapezoidal recess (sliding element)
27 cargo door
28 cargo door fitment
29 bracket plate
30 former
31 sliding element
32 horizontal guide (in the cargo door fitment)
32a retaining tie
33 handle
34 toggle
35 handle end
36 trapezoidal recess (sliding element)
37 bore
38 security bar
39 security cam
40 security recess (sliding element)
41 fuselage cell fitment
42 arm
43 arm
44 overlocking end
45 overlocking end
46 longitudinal opening (fuselage cell fitment)
47 recess (fuselage cell fitment)
48 load transfer surface
49 groove
50 groove
50a surface
51 retaining tie
52 handle
53 handle end
54 toggle
55 sliding element
56 trapezoidal recess (sliding element)
57 incline (linear)
58 incline (linear)
59 thickened area
60 thickened area
61 cargo door fitment
62 arrow
63 arrow
64 transitional surface (curved)
65 transitional surface (curved)
66 coordinate system
67 fuselage cell fitment
68 cargo door fitment
69 forked fitment (cargo door)
70 sliding element
71 loading edge (fuselage cell)
72 arm (forked fitment)
73 arm (forked fitment)
74 former (cargo door)
75 web (forked fitment)
76 security bar
77 security cam
78 security recess
79 shim plate
80 shim plate
81 hooked section (fuselage cell fitment)
82 load transfer surface
83 opening (fuselage cell fitment)
84 thickened area (sliding element)
85 recess (web)
86 contact bearing arm (fuselage cell fitment)
87 recess (arm forked fitment)
88 lower area (arm forked fitment)
89 recess (sliding element)
90 opening curve
91 arrow
92 arrow
93 coordinate system
94 fuselage cell fitment
95 cargo door fitment
96 forked fitment (cargo door)
97 sliding element
98 loading edge (fuselage cell)
99 arm (forked fitment)
100 arm (forked fitment)
101 former (cargo door)
102 security bar
103 security cam
104 security recess
105 roller element
106 surface (sliding element)
107 closing recess (sliding element)
108 forked holder
109 thickened area (sliding element)
110 trapezoidal recess (sliding element)
111 hooked section
112 shim plate (first)
113 web
114 lower area (arm cargo door fitment)
115 load transfer surface
116 recess (arm cargo door fitment)
117 recess (arm cargo door fitment)
118 contact bearing arm
119 shim plate (second)
120 edge (recess arm cargo door fitment)
121 edge (recess arm cargo door fitment)

122 incline (second shim plate)
123 arrow

The invention claimed is:

1. Locking mechanism for a cargo door or a door in a fuselage cell of an aircraft, the locking mechanism comprising:
   a number of fuselage cell fitments which are disposed in an area of a loading edge of the cargo door, and
   a corresponding number of cargo door fitments which are fixed in a lower edge area of the cargo door,
   wherein locking the cargo door is carried out by a sliding element and the cargo door fitments can be brought into positive locking engagement with the fuselage cell fitments wherein peripheral loads of the fuselage cell are transferred substantially by a load transfer surface and radial loads are taken up substantially by the sliding element, characterised in that
   the at least one cargo door fitment is designed as a forked fitment with two arms connected through a horizontal web provided with a securing device for the supplementary self-securing of the sliding element against unintended opening,
   wherein the securing device comprises a security bar having at least one security cam, wherein, when in a locked state of the cargo door, the at least one security cam can be brought into at least one security recess in the sliding element.

2. Locking mechanism according to claim 1, characterised in that the locking of the cargo door in a closed state is carried out by sliding the sliding element substantially parallel to a longitudinal axis of the aircraft.

3. Locking mechanism according to claim 1, characterised in that by sliding the sliding element the cargo door when in a practically closed state can be drawn into a fully closed state.

4. Locking mechanism according to claim 1, wherein by swivelling the security bar the at least one security cam can be brought into the at least one security recess in the sliding element in order to secure the sliding element against unintended displacement.

5. Locking mechanism according to claim 1, characterised in that the securing device contains a thickened area of the sliding element that in the event of a rising pressure load on the fuselage cell can be pressed further and further into a recess of the web for additional self-securing against accidental opening.

6. Locking mechanism according to claim 5, characterised in that as the pressure load on the fuselage cell rises the thickened area can be pressed additionally into recesses of the arms.

7. Locking mechanism according to claim 1, characterised in that the securing device contains a thickened area of the sliding element that in the event of a rising pressure load on the fuselage cell is pressed further and further into recesses in the arms of the forked fitment for additional self-securing against unintended opening.

8. Locking mechanism according to claim 7, characterised in that at least one roller element is provided which rolls on a surface of the sliding element and which in a closed state of the locking mechanism can be brought into positive locking engagement at least in some areas with a closing recess.

* * * * *